United States Patent
Vahabzadeh et al.

(10) Patent No.: US 8,808,135 B2
(45) Date of Patent: Aug. 19, 2014

(54) MULTIPLE SPEED TRANSMISSION WITH A PUMP ASSISTED LAUNCH DEVICE

(75) Inventors: Hamid Vahabzadeh, Oakland, MI (US); James B. Borgerson, Clarkston, MI (US); James M. Hart, Belleville, MI (US); Scott H. Wittkopp, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 219 days.

(21) Appl. No.: 13/349,303

(22) Filed: Jan. 12, 2012

(65) Prior Publication Data

US 2012/0178564 A1 Jul. 12, 2012

Related U.S. Application Data

(60) Provisional application No. 61/432,182, filed on Jan. 12, 2011.

(51) Int. Cl.
*F16H 3/66* (2006.01)
*F16H 47/04* (2006.01)

(52) U.S. Cl.
USPC ............................. 475/280; 475/290; 475/72

(58) Field of Classification Search
USPC ............................. 475/72, 272–292, 296, 330
See application file for complete search history.

(56) References Cited

U.S. PATENT DOCUMENTS

| 4,341,132 | A | * | 7/1982 | Burdick ......................... 475/72 |
| 5,512,021 | A | * | 4/1996 | Shash .............................. 475/1 |
| 6,176,803 | B1 | * | 1/2001 | Meyer et al. .................. 475/286 |
| 6,984,187 | B2 | | 1/2006 | Biermann |
| 6,991,578 | B2 | | 1/2006 | Ziemer |
| 7,011,597 | B2 | | 3/2006 | Haka |
| 7,018,319 | B2 | | 3/2006 | Ziemer |
| 8,251,857 | B1 | * | 8/2012 | Mellet et al. .................. 475/280 |
| 8,435,154 | B1 | * | 5/2013 | Mellet et al. .................. 475/278 |
| 2011/0003660 | A1 | * | 1/2011 | Grant ............................. 475/116 |
| 2012/0077632 | A1 | * | 3/2012 | Babbitt et al. .................... 475/1 |
| 2012/0178572 | A1 | * | 7/2012 | Hart .............................. 475/116 |
| 2013/0053207 | A1 | * | 2/2013 | Wilton et al. ................. 475/276 |

* cited by examiner

*Primary Examiner* — Roger Pang

(57) ABSTRACT

A transmission includes an input member, an output member, four planetary gear sets, a plurality of coupling members and a plurality of torque transmitting devices. The transmission input member is connected to a launch device that includes a planetary gear set connected with a pump or a pump having a rotatable housing connected to an engine and a rotor connected to the transmission input member. Each of the planetary gear sets includes first, second and third members. The torque transmitting devices are for example clutches and brakes.

17 Claims, 4 Drawing Sheets

| Gear State | Gear Ratio | Ratio Step | 230 | 232 | 234 | 236 | 226 | 228 |
|---|---|---|---|---|---|---|---|---|
| Rev | -5.550 | | X | | | X | | |
| N | | -0.96 | | | | O | | |
| 1st | 5.767 | | | X | | X | | |
| 2nd | 3.461 | 1.67 | | | | X | | X |
| 3rd | 2.437 | 1.42 | | | X | | | X |
| 4th | 1.687 | 1.44 | | | | X | | X |
| 5th | 1.278 | 1.32 | X | | | | | X |
| 6th | 1.000 | 1.28 | | | | | X | X |
| 7th | 0.828 | 1.21 | X | | | | X | |
| 8th | 0.721 | 1.15 | | | | X | X | |
| 9th | 0.614 | 1.13 | | | X | | X | |

US 8,808,135 B2

MULTIPLE SPEED TRANSMISSION WITH A PUMP ASSISTED LAUNCH DEVICE

CROSS-REFERENCE

This application claims the benefit of U.S. Provisional Application No. 61/432,182, filed Jan. 12, 2011. The entire contents of the above application are incorporated herein by reference.

FIELD

The invention relates generally to a powertrain having a pump assisted launch device coupled to a multiple speed transmission, and more particularly to a powertrain having an engine connected to a rotating housing of a pump and a transmission a rotor of the pump.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A powertrain is provided having an engine and a launch device that supplies a driving torque to a transmission which supplies various gear or speed ratios to a final drive unit. In one embodiment, the launch device includes a positive displacement pump coupled with a gear set. The positive displacement pump is preferably a high efficiency pump that acts as a reaction element through the gear set during vehicle launch. In another embodiment, the launch device includes a pump having a rotatable housing connected to the engine and a rotor connected to the transmission.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
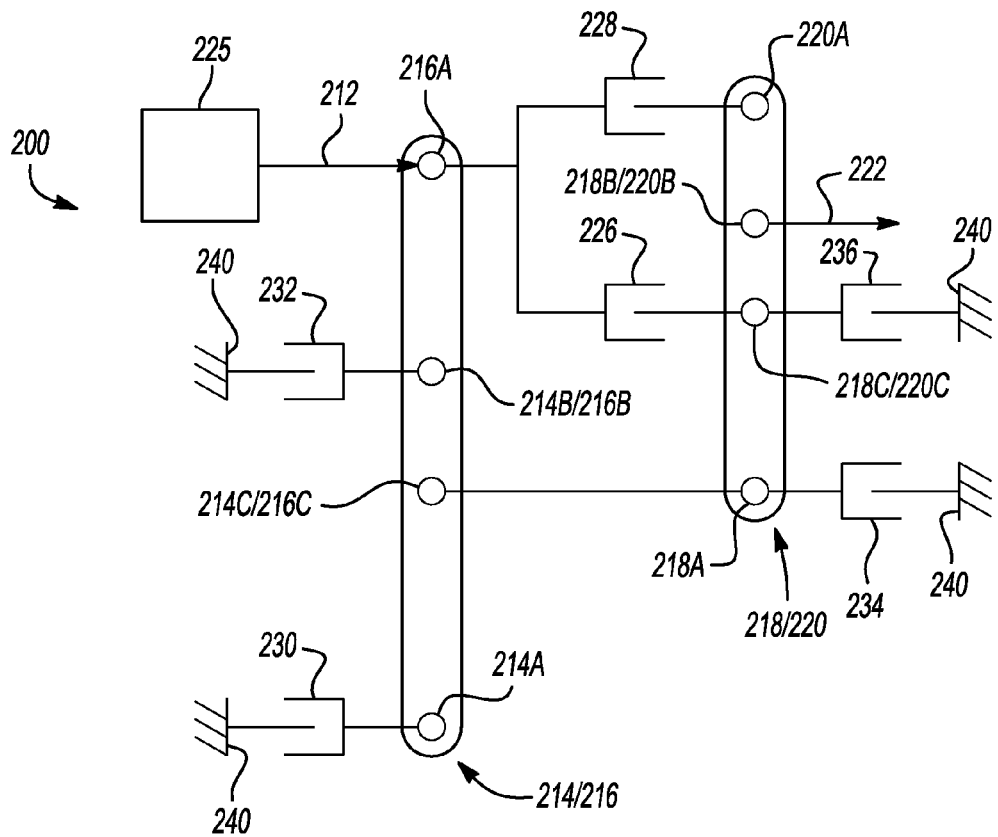
FIG. 1 is a lever diagram of an embodiment of a nine speed transmission according to the present invention.

Referring to FIG. 1, an embodiment of a nine speed transmission 200 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 200 includes an input shaft or member 212, a first planetary gear set 214 having three nodes: a first node 214A, a second node 214B and a third node 214C, a second planetary gear set 216 having three nodes: a first node 216A, a second node 216B and a third node 216C, a third planetary gear set 218 having three nodes: a first node 218A, a second node 218B and a third node 218C, a fourth planetary gear set 220 having three nodes: a first node 220A, a second node 220B and a third node 220C and an output shaft or member 222.

The input member 212 is coupled to a launch device 225 and the first node 216A of the second planetary gear set 216. The output member 222 is coupled to the second node 218B of the third planetary gear set 218 and the second node 220B of the fourth planetary gear set 220. The second node 214B of the first planetary gear set 214 is coupled to the second node 216B of the second planetary gear set 216. The third node 214C of the first planetary gear set 214 is coupled to the third node 216C of the second planetary gear set 216 and the first node 218A of the third planetary gear set 218. The second node 218B of the third planetary gear set 218 is coupled to the second node 220B of the fourth planetary gear set 220. The third node 218C of the third planetary gear set 18 is coupled to the third node 220C of the fourth planetary gear set 220.

A first clutch 226 selectively connects the first node 216A of the second planetary gear set 216 and the input member 212 with the third node 218C of the third planetary gear set 218 and the third node 220C of the fourth planetary gear set 220. A second clutch 228 selectively connects the first node 216A of the second planetary gear set 216 and the input member 212 with the first node 220A of the fourth planetary gear set 220. A first brake 230 selectively connects the first node 214A of the first planetary gear set 214 to a stationary member or a transmission housing 240. A second brake 232 selectively connects the second node 214B of the first planetary gear set 214 and the second node 216B of the second planetary gear set 216 to a stationary member or transmission housing 240. A third brake 234 selectively connects the third node 214C of the first planetary gear set, the third node 216C of the second planetary gear set 216, and the first node 218A of the third planetary gear set 218 to the stationary member or transmission housing 240. A fourth brake 236 selectively connects the third node 218C of the third planetary gear set 218 and the third node 220C of the fourth planetary gear set 220 to the stationary member or transmission housing 240.

Figures 2, 3:
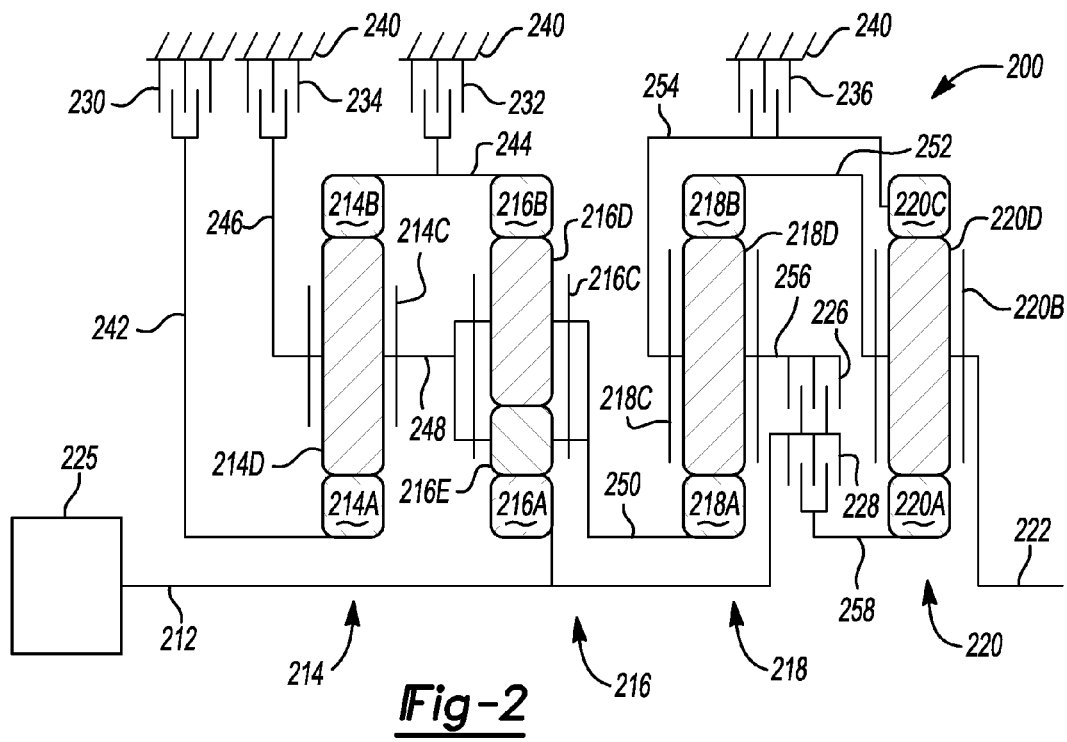
FIG. 2 is a stick diagram of an embodiment of a nine speed transmission according to the present invention.
FIG. 3 is a truth table presenting the state of engagement of the various torque transmitting elements in each of the available forward and reverse speeds or gear ratios of the transmission illustrated in FIGS. 1 and 2.

Referring now to FIG. 2, a stick diagram presents a schematic layout of an embodiment of the nine speed transmission 200 according to the present invention. In FIG. 2, the numbering from the lever diagram of FIG. 1 is carried over. The clutches, brakes, and couplings are correspondingly presented whereas the nodes of the planetary gear sets now appear as components of planetary gear sets such as sun gears, ring gears, planet gears and planet gear carriers.

For example, the first planetary gear set 214 includes a sun gear member 214A, a planet gear carrier member 214C and a ring gear member 214B. The sun gear member 214A is connected for common rotation with a first shaft or interconnecting member 242. The ring gear member 214B is connected for common rotation with a second shaft or interconnecting member 244. The planet gear carrier member 214C rotatably supports a set of planet gears 214D (only one of which is shown) and is connected for common rotation with a third shaft or interconnecting member 246 and a fourth shaft or interconnecting member 248. The planet gears 214D are each configured to intermesh with both the sun gear member 214A and the ring gear member 214B.

The second planetary gear set 216 includes a sun gear member 216A, a planet carrier member 216C that rotatably supports a set of planet gears 216D and 216E, and a ring gear member 216B. The sun gear member 216A is connected for common rotation with the input member 212. The ring gear member 216B is connected for common rotation with the second shaft or interconnecting member 244. The planet carrier member 216C is connected for common rotation with the fourth shaft or interconnecting member 248 and a fifth shaft or interconnecting member 250. The planet gears 216D are each configured to intermesh with both the ring gear member 216B and the planet gears 216E. The planet gears 216E are each configured to intermesh with both the planet gears 216D and the sun gear 216A.

The third planetary gear set 218 includes a sun gear member 218A, a ring gear member 218B and a planet carrier member 218C that rotatably supports a set of planet gears 218D. The sun gear member 218A is connected for common rotation with the fifth interconnecting member 250. The ring gear member 218B is connected for common rotation with a sixth shaft or interconnecting member 252. The planet carrier member 218C is connected for common rotation with a seventh shaft or interconnecting member 254 and with an eighth shaft or interconnecting member 256. The planet gears 218D are each configured to intermesh with both the sun gear member 218A and the ring gear member 218B.

The fourth planetary gear set 220 includes a sun gear member 220A, a ring gear member 220C and a planet carrier member 220B that rotatably supports a set of planet gears 220D. The sun gear member 220A is connected for common rotation with a ninth shaft or interconnecting member 258. The ring gear member 220C is connected for common rotation with the seventh interconnecting member 254. The planet carrier member 220B is connected for common rotation with the sixth interconnecting member 252 and with the output member 222. The planet gears 220D are each configured to intermesh with both the sun gear member 220A and the ring gear member 220C.

The input shaft or member 212 is connected to the launch device 225. The output shaft or member 222 is preferably continuously connected with a final drive unit or transfer case (not shown).

The torque-transmitting mechanisms or clutches 226, 228 and brakes 230, 232, 234, 236 allow for selective interconnection of the shafts or interconnecting members, members of the planetary gear sets and the housing. For example, the first clutch 226 is selectively engageable to connect the eighth interconnecting member 256 with the input member 212. The second clutch 228 is selectively engageable to connect the ninth interconnecting member 258 with the input member 212. The first brake 230 is selectively engageable to connect the first interconnecting member 242 to the stationary member or transmission housing 240 in order to restrict the sun gear member 214A of the first planetary gear set 214 from rotating relative to the stationary member or transmission housing 240. The second brake 232 is selectively engageable to connect the second interconnecting member 244 to the stationary member or transmission housing 240 in order to restrict the ring gear member 214B of the first planetary gear set 214 and the ring gear member 216B of the second planetary gear set 216 from rotating relative to the stationary member or transmission housing 240. The third brake 234 is selectively engageable to connect the third interconnecting member 246 to the stationary member or transmission housing 240 in order to restrict the planet carrier member 214C of the first planetary gear set 214, the planet carrier member 216C of the second planetary gear set 216, and the sun gear 218A of the third planetary gear set 218 from rotating relative to the stationary member or transmission housing 240. The fourth brake 236 is selectively engageable to connect the seventh interconnecting member 254 to the stationary member or transmission housing 240 in order to restrict the planet carrier member 218C of the third planetary gear set 218 and the ring gear member 220C of the fourth planetary gear set 220 from rotating relative to the stationary element or transmission housing 240.

Referring now to FIGS. 2 and 3, the operation of the embodiment of the nine speed transmission 200 will be described. It will be appreciated that the transmission 200 is capable of transmitting torque from the input shaft or member 212 to the output shaft or member 222 in at least nine forward speed or torque ratios and at least one reverse speed or torque ratio. Each forward and reverse speed or torque ratio is attained by engagement of one or more of the torque-transmitting mechanisms (i.e. first clutch 226, second clutch 228, first brake 230, second brake 232, third brake 234, and fourth brake 236), as will be explained below. FIG. 3 is a truth table presenting the various combinations of torque transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 200. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first brake 230 and the fourth brake 236 are engaged or activated. The first brake 230 connects the first interconnecting member 242 to the stationary member or transmission housing 240 in order to restrict the sun gear member 214A of the first planetary gear set 214 from rotating relative to the stationary member or transmission housing 240. The fourth brake 236 connects the seventh interconnecting member 254 to the stationary member or transmission housing 240 in order to restrict the planet carrier member 218C of the third planetary gear set 218 and the ring gear member 220C of the fourth planetary gear set 220 from rotating relative to the stationary element or transmission housing 240. Likewise, the nine forward ratios are achieved through different combinations of clutch and brake engagement, as shown in FIG. 3.

Figure 4:
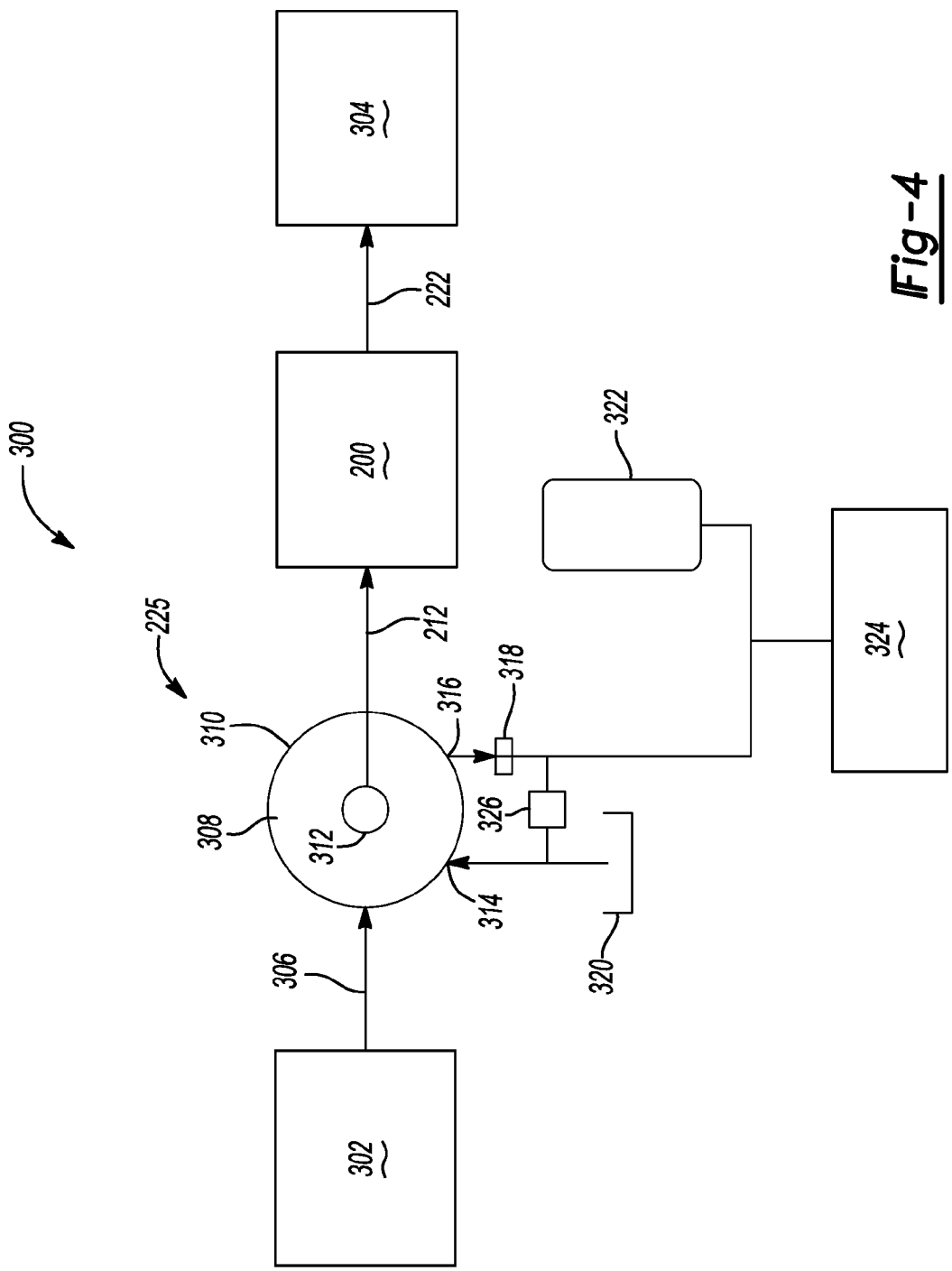
FIG. 4 is a schematic diagram of a powertrain employing the transmissions of FIGS. 1-3 incorporated with a launch device according to the principles of the present invention.

Referring to FIG. 4, a schematic diagram of a powertrain for a motor vehicle is indicated by reference number 300. The powertrain 300 includes an engine 302 coupled with the launch device 225 that supplies a driving torque to the transmission 200, described above, which supplies various gear or speed ratios to a final drive unit 304. The engine 302 may be a conventional internal combustion engine or an electric engine, or any other type of prime mover, without departing from the scope of the present disclosure. The engine 302 supplies a driving torque to the launch device 225 through an engine output shaft 306.

The launch device 225 includes a positive displacement pump 308 having a rotatable housing 310 and a rotor 312. The rotatable housing 310 is coupled to the engine output shaft 306 and the rotor 312 is coupled to the transmission input shaft 212. The pump 308 is preferably located on axis with the engine output shaft 306 and therefore receives no multiplication of engine torque or engine speed. Instead the pump 308 uses the static pressure of the hydraulic fluid within the pump 308 times the displacement of the pump 308 (e.g. area of a vane or a piston) for producing hydraulic torque. The pump 308 preferably operates at a high efficiency and high pressure (e.g. 1500 to 5000 psi) at close to zero speed. Therefore, the pump 308 is preferably a radial or axial piston pump.

During launch of the powertrain 300 there is relative speed between the engine output shaft 306 and the transmission input shaft 212. Therefore, there is relative speed between the pump housing 310 and the pump rotor 312 which pumps hydraulic fluid from an inlet 314 of the pump 308 to an outlet 316 of the pump 308. The inlet 314 is connected to a sump 320. The outlet 316 is connected to an accumulator 322 and a valve body 324 through a flow control valve 318. When pressure of the hydraulic fluid builds up due to flow restriction, the hydraulic fluid starts transmitting torque from the rotating housing 310 to the stationary rotor 312 and the powertrain 300 begins to launch. Flow restriction of the hydraulic fluid may be controlled by operating the valve 318. Alternatively, the pump 308 may be operated through regenerative braking wherein the transmission input shaft 212 provides the driving torque to the pump 308. When the pump 308 reaches a coupling speed, the speed of the transmission input shaft 212 equals the speed of the engine output shaft 306 and therefore the pump 308 ceases to pump the hydraulic fluid.

During launch, the hydraulic fluid may be directed into the accumulator 322 to provide potential energy storage and/or to the valve body 324 to provide pressurized hydraulic fluid to the control systems of the transmission 200. In addition, the hydraulic fluid from the outlet 316 may be diverted through a valve 326 back to the inlet 314 to provide additional inlet oil flow.

Figure 5:
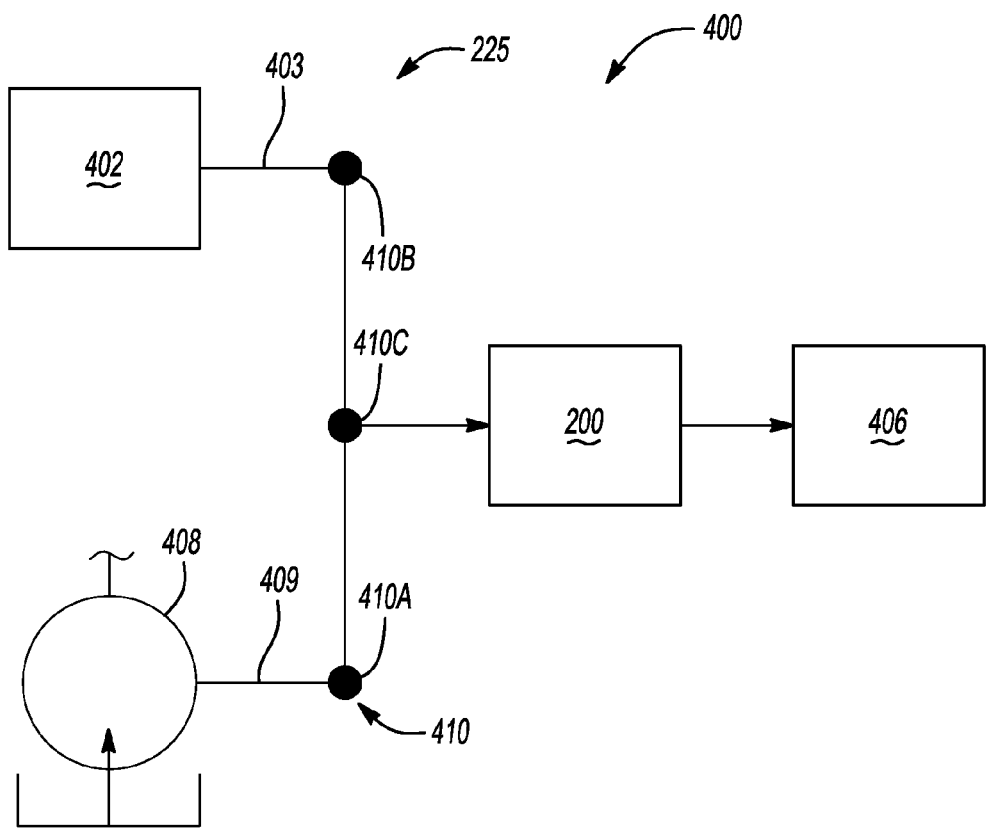
FIG. 5 is a schematic diagram of another powertrain employing the transmissions of FIGS. 1-3 incorporated with a launch device according to the principles of the present invention.

Turning to FIG. 5, a schematic diagram of another example of a powertrain for a motor vehicle is indicated by reference number 400. The powertrain 400 includes an engine 402 and the launch device 225 that supplies a driving torque to the transmission 200, described above, which supplies various gear or speed ratios to a final drive unit 406. The engine 402 may be a conventional internal combustion engine or an electric engine, or any other type of prime mover, without departing from the scope of the present disclosure. The engine 402 supplies a driving torque to the launch device 225 through an engine output shaft 403. The launch device 225 includes a positive displacement pump 408 having a rotor 409 coupled with a gear set 410. For example, the gear set 410 may be a planetary gear set having a sun gear 410A, a ring gear 410B, and a carrier member 410C. In one example, the rotor 409 of the pump 408 is connected to the sun gear 410A, the transmission input member 212 is connected to the carrier member 410C, and the engine output member 403 is connected to the ring gear 410B. The positive displacement pump 408 is preferably a high efficiency pump that acts as a reaction element through the gear set 410 during vehicle launch. Additionally the pump 408 is driven by the engine 402 through the gear set 410. In another example, a one-way clutch is disposed between the pump 408 and the launch gear set 410 to allow engine braking during coasting.

The description of the invention is merely exemplary in nature and variations that do not depart from the gist of the invention are intended to be within the scope of the invention. Such variations are not to be regarded as a departure from the spirit and scope of the invention.

The following is claimed:

1. A drive train connected with an engine in a motor vehicle, the drive train comprising:
a launch device having a pump and a launch planetary gear set having a first, a second, and a third member, wherein one of the first, second, and third members of the launch planetary gear set is connected with the engine and another of the first, second, and third members is connected with the pump;
a transmission input member connected for common rotation with yet another of the first, second, and third members of the launch planetary gear set;
a transmission output member;
first, second, third, and fourth planetary gear sets each having a first, a second, and a third member, wherein the second member of the first planetary gear set is connected with the second member of the second planetary gear set, the third member of the first planetary gear set is connected with the third member of the second planetary gear set and the first member of the third planetary gear set, the second member of the third planetary gear set is connected with the second member of the fourth planetary gear set, the third member of the third planetary gear set is connected with the third member of the fourth planetary gear set, and the transmission output member is connected for common rotation with the second member of the third planetary gear set and the second member of the fourth planetary gear set;
six torque transmitting mechanisms each selectively engageable to interconnect one of the first members, second members, and third members of the first, second, third, and fourth planetary gear sets with at least one other of the first members, second members, and third members, of the first, second, third, and fourth planetary gear sets and a stationary member, and wherein the torque transmitting mechanisms are selectively engageable in combinations of at least two to produce a plurality of forward speed ratios between the transmission input member and the transmission output member.

2. The drive train of claim 1 wherein the six torque transmitting mechanisms includes a first clutch for selectively connecting the first member of the second planetary gear set with the third members of the third and fourth planetary gear sets.

3. The drive train of claim 2 wherein the six torque transmitting mechanisms includes a second clutch for selectively connecting the first member of the second planetary gear set with the first member of the fourth planetary gear set.

4. The drive train of claim 3 wherein the six torque transmitting mechanisms includes a first brake for selectively connecting the first member of the first planetary gear set with the stationary member.

5. The drive train of claim 4 wherein the six torque transmitting mechanisms includes a second brake for selectively connecting the second members of the first and second planetary gear sets with the stationary member.

6. The drive train of claim 5 wherein the six torque transmitting mechanisms includes a third brake for selectively connecting the first member of the third planetary gear set and the third members of the first and second planetary gear sets with the stationary member.

7. The drive train of claim 6 wherein the six torque transmitting mechanisms includes a fourth brake for selectively connecting the third members of the third and fourth planetary gear sets with the stationary member.

8. The drive train of claim 1 wherein the transmission input member is connected for common rotation with the first member of the second planetary gear set.

9. The drive train of claim 1 wherein the first members of the first, second, third, and fourth planetary gear sets are sun gears, the second members of the first, second, and third planetary gear sets and the third member of the fourth planetary gear set are ring gears, and the third members of the first, second, and third planetary gear sets and the second member of the fourth planetary gear set are carrier members.

10. The drive train of claim 1 wherein the engine is connected with the second member of the launch gear set, the pump is connected with the first member of the launch gear set, and the transmission input member is connected with the third member of the launch gear set.

11. A drive train in a motor vehicle, the drive train comprising:

an engine having an engine output member;

a launch planetary gear set having a first, a second, and a third member, wherein the second member of the launch planetary gear set is connected with the engine output member;

a pump having a rotor connected with the first member of the launch planetary gear set;

a transmission input member connected for common rotation with the third member of the launch planetary gear set;

a transmission output member;

first, second, third, and fourth planetary gear sets each having a first, a second, and a third member, wherein the second member of the first planetary gear set is connected with the second member of the second planetary gear set, the third member of the first planetary gear set is connected with the third member of the second planetary gear set and the first member of the third planetary gear set, the second member of the third planetary gear set is connected with the second member of the fourth planetary gear set, and the third member of the third planetary gear set is connected with the third member of the fourth planetary gear set;

a first clutch for selectively connecting the first member of the second planetary gear set with the third members of the third and fourth planetary gear sets;

a second clutch for selectively connecting the first member of the second planetary gear set with the first member of the fourth planetary gear set;

a first brake for selectively connecting the first member of the first planetary gear set with a stationary member;

a second brake for selectively connecting the second members of the first and second planetary gear sets with the stationary member;

a third brake for selectively connecting the first member of the third planetary gear set and the third members of the first and second planetary gear sets with the stationary member; and a fourth brake for selectively connecting the third members of the third and fourth planetary gear sets with the stationary member, and wherein the clutches and brakes are selectively engageable in combinations of at least two to produce a plurality of forward speed ratios between the transmission input member and the transmission output member, and wherein the pump is selectively engageable to act as a reaction element on the launch planetary gear set.

12. The drive train of claim 11 wherein the transmission input member is connected for common rotation with the first member of the second planetary gear set.

13. The drive train of claim 11 wherein the transmission output member is connected for common rotation with the second member of the third planetary gear set and the second member of the fourth planetary gear set.

14. The drive train of claim 11 wherein the first members of the first, second, third, and fourth planetary gear sets and the launch planetary gear set are sun gears, the second members of the first, second, and third planetary gear sets, the third member of the fourth planetary gear set, and the second member of the launch planetary gear set are ring gears, and the third members of the first, second, and third planetary gear sets, the second member of the fourth planetary gear set, and the third member of the launch planetary gear set are carrier members.

15. A drive train in a motor vehicle, the drive train comprising:

an engine having an engine output member;

a launch planetary gear set having a sun gear, a ring gear, and a carrier, wherein the ring gear of the launch planetary gear set is connected with the engine output member;

a pump having a rotor connected with the sun gear of the launch planetary gear set;

a transmission input member connected with the carrier member of the launch planetary gear set;

a transmission output member;

first, second, third, and fourth planetary gear sets each having a sun gear, a ring gear, and a carrier, wherein the ring gear of the first planetary gear set is connected with the ring gear of the second planetary gear set, the carrier of the first planetary gear set is connected with the carrier of the second planetary gear set and the sun gear of the third planetary gear set, the ring gear of the third planetary gear set is connected with the carrier of the fourth planetary gear set, and the carrier of the third planetary gear set is connected with the ring gear of the fourth planetary gear set;

a first clutch for selectively connecting the sun gear of the second planetary gear set with the carrier of the third planetary gear set and the ring gear of the fourth planetary gear set;

a second clutch for selectively connecting the sun gear of the second planetary gear set with the sun gear of the fourth planetary gear set;

a first brake for selectively connecting the sun gear of the first planetary gear set with a stationary member;

a second brake for selectively connecting the ring gears of the first and second planetary gear sets with the stationary member;

a third brake for selectively connecting the sun gear of the third planetary gear set and the carriers of the first and second planetary gear sets with the stationary member; and a fourth brake for selectively connecting the carrier of the third planetary gear set and the ring gear of the fourth planetary gear set with the stationary member, and wherein the clutches and brakes are selectively engageable in combinations of at least two to produce a plurality of forward speed ratios between the transmission input member and the transmission output member.

16. The drive train of claim 15 wherein the transmission input member is connected for common rotation with the sun gear of the second planetary gear set.

17. The drive train of claim 15 wherein the transmission output member is connected for common rotation with the ring gear of the third planetary gear set and the carrier of the fourth planetary gear set.

* * * * *